(12) United States Patent
Chien et al.

(10) Patent No.: US 10,865,029 B2
(45) Date of Patent: *Dec. 15, 2020

(54) PACKAGING BAG FRESH-KEEPING EXHAUST VALVE STRUCTURE

(71) Applicant: Yi-An Chien, Taichung (TW)

(72) Inventors: Yi-An Chien, Taichung (TW); Tsung-Ping Chien, Taichung (TW)

(73) Assignee: CHUANPEN INTERNATIONAL PACKING CO., LTD., Taichung (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/151,341

(22) Filed: Oct. 4, 2018

(65) Prior Publication Data
US 2019/0241295 A1   Aug. 8, 2019

(30) Foreign Application Priority Data
Feb. 5, 2018 (TW) .............................. 107103912 A

(51) Int. Cl.
*B65D 77/22* (2006.01)
*B65D 81/26* (2006.01)
*F16K 15/02* (2006.01)

(52) U.S. Cl.
CPC ......... *B65D 77/225* (2013.01); *B65D 81/266* (2013.01); *F16K 15/023* (2013.01); *B65D 2205/00* (2013.01)

(58) Field of Classification Search
CPC .... B65D 77/225; B65D 81/266; B65D 81/26; B65D 2205/00; F16K 15/023
See application file for complete search history.

(56) References Cited

U.S. PATENT DOCUMENTS

| 3,949,934 | A | * | 4/1976 | Goglio | B65D 77/225 383/103 |
| 4,420,015 | A | * | 12/1983 | Blaser | B65D 77/225 137/852 |
| 5,354,133 | A | * | 10/1994 | Rapparini | B65D 77/225 137/246 |
| 5,515,994 | A | * | 5/1996 | Goglio | B65D 51/1616 220/371 |
| 5,665,408 | A | * | 9/1997 | Coupe | B65D 77/225 206/550 |
| 6,056,439 | A | * | 5/2000 | Graham | B65D 77/225 220/89.1 |

(Continued)

*Primary Examiner* — David Colon-Morales

(57) ABSTRACT

A packaging bag fresh-keeping exhaust valve structure is an exhaust valve and includes a valve body, a valve plate and a preservative. The valve body includes a partition to partition its internal space into a valve chamber and a filling chamber. The partition has at least one through hole, so that the valve chamber communicates with the filling chamber through the through hole. The valve plate is disposed in the valve chamber. An outer peripheral edge of the valve chamber has a flange extending outwardly. A surface of the flange is provided with a first sealing film to confine the valve plate within the valve chamber. The preservative is disposed in the filling chamber. An inlet end of the filling chamber is provided with a breathable film to confine the preservative within the filling chamber. An outer end of the breathable film is provided with a second sealing film.

4 Claims, 4 Drawing Sheets

(56) References Cited

U.S. PATENT DOCUMENTS

| | | | | |
|---|---|---|---|---|
| 6,070,728 | A * | 6/2000 | Overby | B65D 77/225 137/526 |
| 6,095,324 | A * | 8/2000 | Mullin | B65D 81/266 206/204 |
| 6,468,332 | B2 * | 10/2002 | Goglio | B65D 77/225 220/372 |
| 6,821,594 | B2 * | 11/2004 | Watanabe | B32B 27/06 206/204 |
| 7,243,683 | B2 * | 7/2007 | Stotkiewitz | B65D 77/225 137/512.15 |
| 7,972,064 | B2 * | 7/2011 | Anderson | B65D 33/2508 251/82 |
| 8,342,203 | B2 * | 1/2013 | Weaver | B65D 77/225 137/533.17 |
| 8,434,633 | B2 * | 5/2013 | Beer | B65D 77/225 206/524.8 |
| 8,555,925 | B2 * | 10/2013 | Stadel | B65D 77/225 137/246 |
| 8,746,281 | B2 * | 6/2014 | Morin | B32B 3/266 137/852 |
| 9,481,502 | B2 * | 11/2016 | Bosetti | B65D 65/466 |
| 9,657,856 | B2 * | 5/2017 | Buckingham | B65D 77/225 |
| 10,358,275 | B1 * | 7/2019 | Cramer | F16K 7/17 |
| 2003/0106589 | A1 * | 6/2003 | Basso | B65D 77/225 137/512.15 |
| 2009/0026199 | A1 * | 1/2009 | Jeor | B65D 77/225 220/89.1 |
| 2010/0282768 | A1 * | 11/2010 | Rapparini | B65D 77/225 220/745 |
| 2012/0042975 | A1 * | 2/2012 | Stotkiewitz | B65D 77/225 137/843 |
| 2016/0122117 | A1 * | 5/2016 | Moore | B65D 81/268 206/204 |
| 2016/0264332 | A1 * | 9/2016 | Rapparini | B65D 65/466 |
| 2019/0248547 | A1 * | 8/2019 | Chien | B65D 33/01 |

* cited by examiner

PACKAGING BAG FRESH-KEEPING EXHAUST VALVE STRUCTURE

FIELD OF THE INVENTION

The present invention relates to a packaging bag fresh-keeping exhaust valve structure which can prolong the shelf life of a dried food packaged in a packaging bag.

BACKGROUND OF THE INVENTION

People have higher and higher requirements for the preservation of foods. Generally, in addition to freezing and refrigerating foods to inhibit bacterial growth, isolating air and moisture is also a way to avoid food deterioration. A conventional packaging bag is used for packaging dried foods. When the packaging bag is opened, there is no re-sealing structure. Another packaging bag is provided with a zipper for temporarily closing the mouth of the bag to prevent food from falling out or preventing cockroaches or other insects from entering the bag to contaminate the food. Because there is still a lot of air in the bag, the food (such as coffee, tea, etc.) in the bag may be deteriorated due to moisture. A conventional choke valve for packaging bags is disclosed. A packaging bag is provided with a plurality of air outlets. A choke valve is attached to the inner side of the packaging bag, corresponding in position to the air outlets. The chamber of the choke valve is provided with a diaphragm that is confined by a plurality of stoppers for blocking a plurality of air holes on the bottom surface of the chamber. When the packaging bag is squeezed, the diaphragm is pushed up by the air from the air holes, and the air is exhausted through the air outlets. A pressure difference is formed inside and outside of the bag, so that the diaphragm is attached to the air holes to prevent outside air and moisture from entering the packaging bag. The above-mentioned conventional choke valve can exhaust the air in the bag to the outside by squeezing the bag and can prevent outside air from entering the bag to reduce the effect of air or moisture on the oxidative deterioration of the food. By squeezing the packaging bag, most of the air in the packaging bag can be exhausted to the outside. However, a little air will be left in the bag. The little air still affects the deterioration or freshness of the food, and it is unable to ensure the safe shelf life of the food.

SUMMARY OF THE INVENTION

The primary object of the present invention is to provide a packaging bag fresh-keeping exhaust valve structure that is an exhaust valve and comprises a valve body, a valve plate and a preservative. The valve body is provided with a partition to partition the internal space of the valve body into a valve chamber and a filling chamber. The partition is formed with at least one through hole, so that the valve chamber and the filling chamber communicate with each other through the through hole. The valve plate is disposed in the valve chamber. An outer peripheral edge of an open end of the valve chamber is provided with a flange extending radially outwardly. A surface of the flange is provided with a first sealing film to confine the valve plate within the valve chamber. The preservative is disposed in the filling chamber. An inlet end of the filling chamber is provided with a breathable film to confine the preservative within the filling chamber. An outer end of the breathable film is provided with a second sealing film. When not in use, the preservative filled in the filling chamber is sealed by the first sealing film and the second sealing film to prevent outside air or moisture from entering the filling chamber, so that active ingredients of the preservative can be stored for a long time. When a dried food is to be packaged by using a packaging bag having the exhaust valve, in the process of manufacturing the packaging bag, the second sealing film is opened, and a surface of the first sealing film is adhered to a paper surface inside the packaging bag, and the paper surface is perforated relative to the valve chamber to form an air outlet penetrating the first sealing film so that the valve chamber can communicate with the outside through the air outlet. When the packaging bag is sealed to complete the packing of the dried food, there is a space inside the packaging bag relative to the dried food. By squeezing the outside of the packaging bag, the valve plate in the valve chamber of the valve body can be moved back and forth relative to the position of the through hole, such that the air in the space passes through the preservative and the through hole in a one-way manner, and the air is squeezed out from the air outlet of the packaging bag to the outside. The air not squeezed out, is remained in the packaging bag. The preservative in the filling chamber can pass through the breathable film to the inside of the packaging bag for dehumidifying or deoxidizing the air remaining in the packaging bag, which can reduce or avoid the deterioration of the dried food caused by the residual air and effectively prolong the shelf life of the dried food in the packaging bag.

Preferably, a filtrating film is attached to a surface of one end of the partition in the valve body. The filtrating film covers one end of the through hole. The filtrating film is configured to prevent the preservative in the filling chamber from leaking, so that the powder of the preservative is prevented from entering the valve chamber to ensure that the operation of the valve plate to close the through hole in one direction is normal and the exhausting effect is good for a long time.

Preferably, the inlet end of the filling chamber of the valve body is provided with a stepped mouth portion. The breathable film and the second sealing film are sequentially, from the inside to the outside, attached to the stepped mouth portion to form a gap between the breathable film and the second sealing film. When the second sealing film is punctured by a needle, the needle only enters the gap without damaging the breathable film. The second sealing film is punctured to form a vent hole for the preservative in the filling chamber to communicate with the inside of the packaging bag.

Preferably, the second sealing film which can be peeled off is adhered to the outer end of the breathable film at the inlet end of the filling chamber. The second sealing film can be individually removed from the outer end of the breathable film, so that the preservative in the filling chamber can communicate with the inside of the packaging bag.

DETAILED DESCRIPTION OF THE PREFERRED EMBODIMENTS

Embodiments of the present invention will now be described, by way of example only, with reference to the accompanying drawings.

Figure 1:
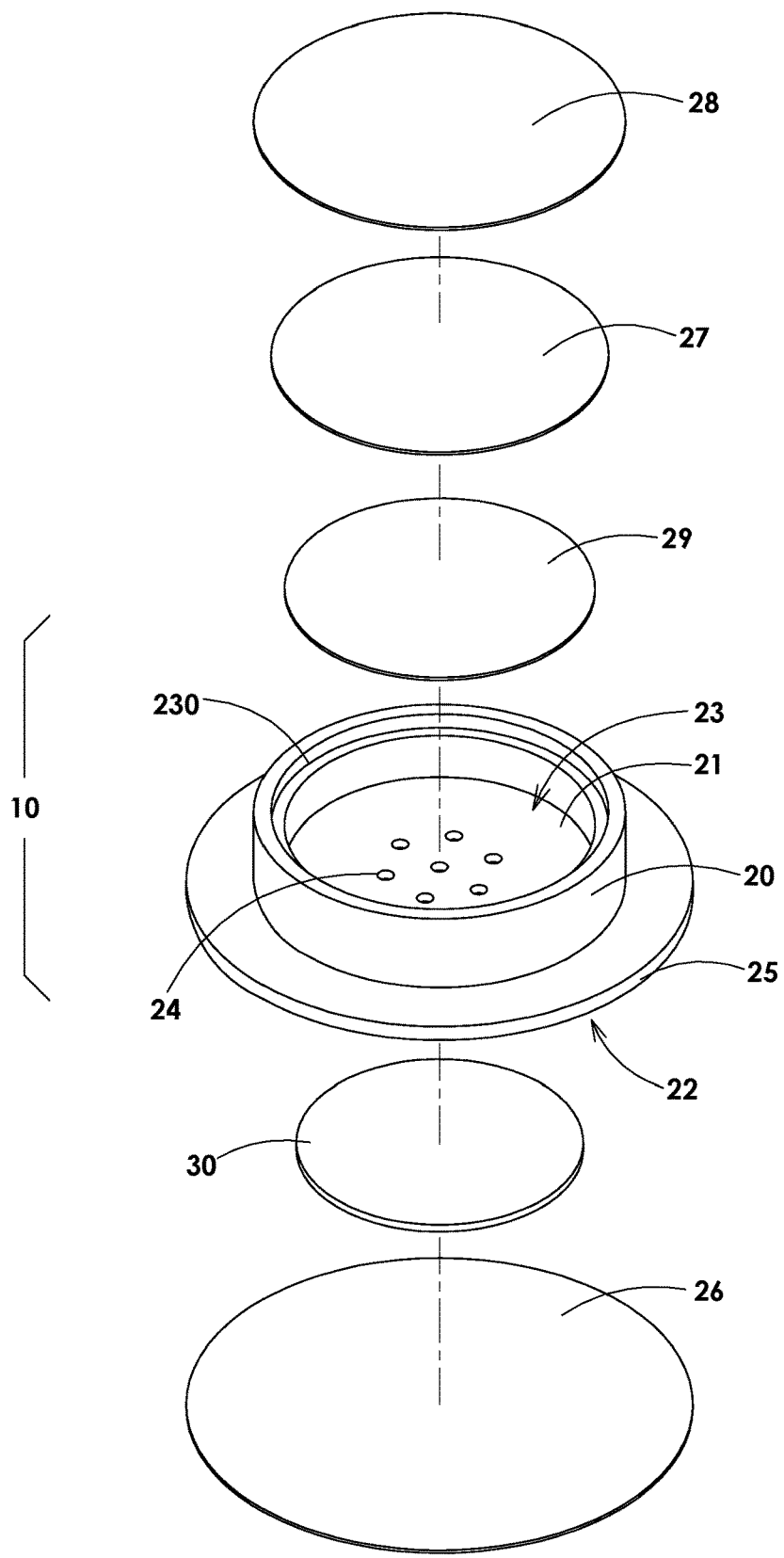
FIG. 1 is an exploded view of the present invention.
Figure 2:
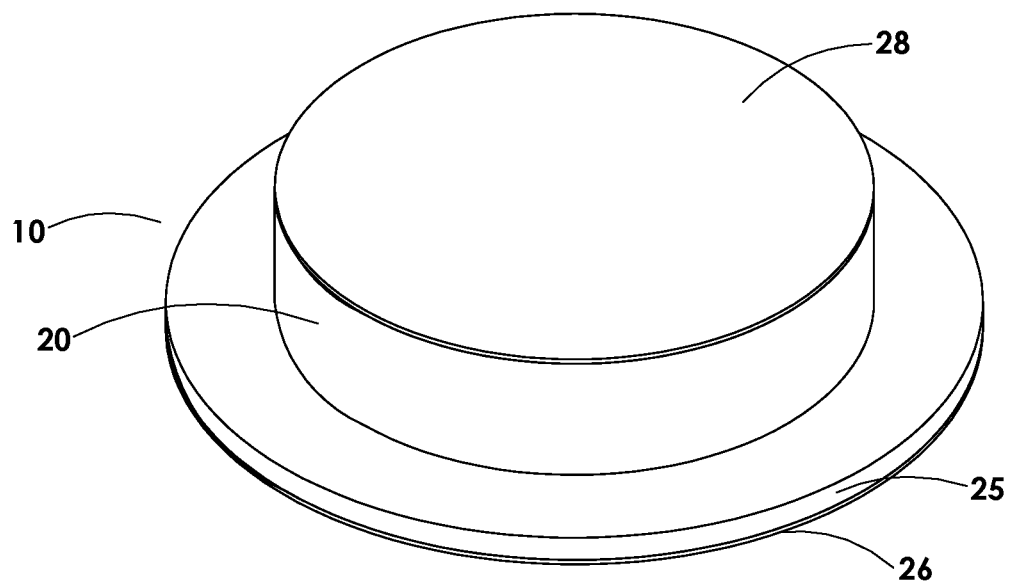
FIG. 2 is a perspective view of the present invention.
Figure 3:
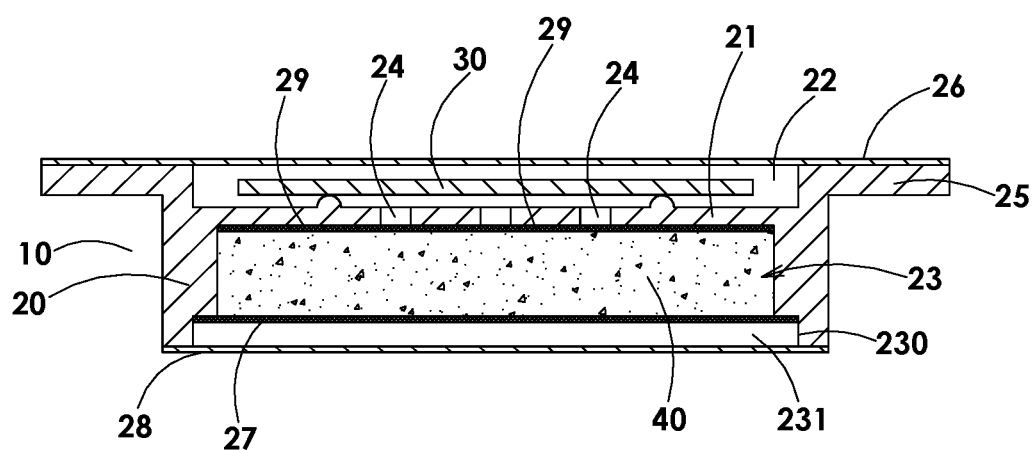
FIG. 3 is a cross-sectional view of the present invention.
Figure 4:
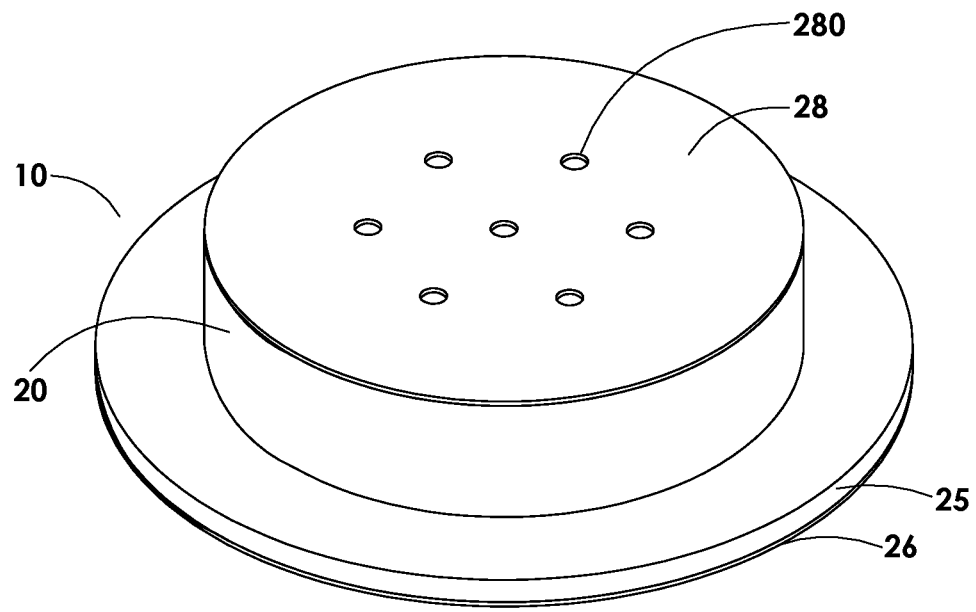
FIG. 4 is a schematic view in accordance with an embodiment of the present invention, showing the filling chamber is opened.
Figure 5:
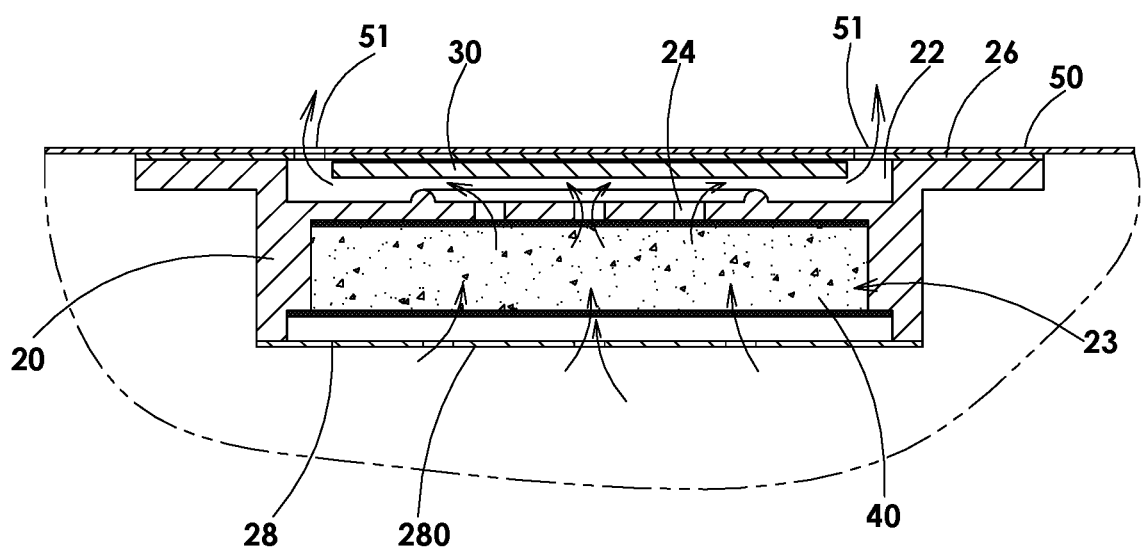
FIG. 5 is a schematic view of the present invention, showing the packaging bag in an exhaust state.
Figure 6:
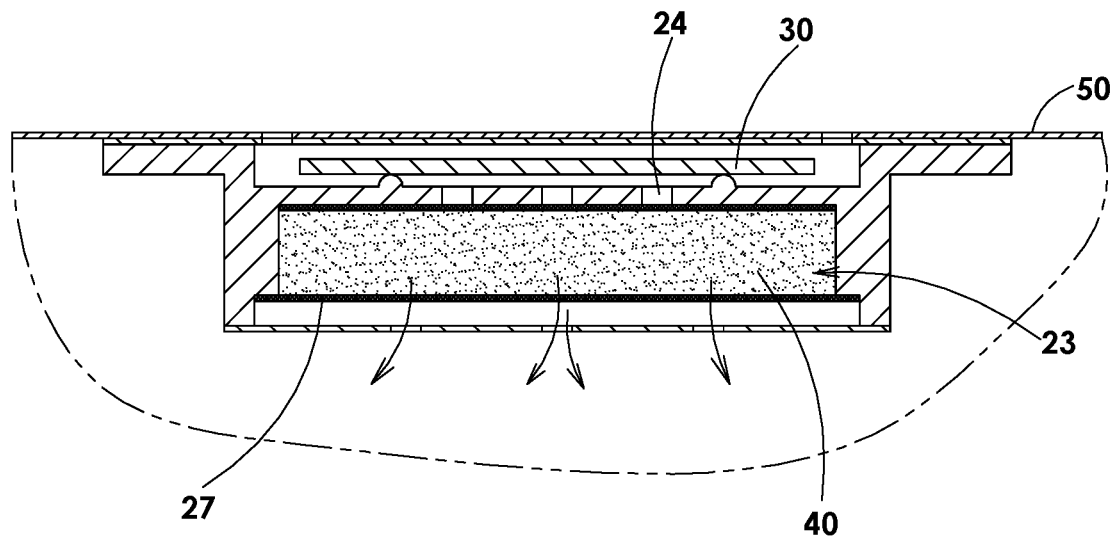
FIG. 6 is a schematic view showing the action of the preservative for the packaging bag of the present invention.

A packaging bag fresh-keeping exhaust valve structure, as shown in FIGS. 1-3, is an exhaust valve 10, comprising a valve body 20, a valve plate 30 and a preservative 40. The valve body 20 is provided with a partition 21 to partition its internal space into a valve chamber 22 and a filling chamber 23. The partition 21 is formed with at least one through hole 24, so that the valve chamber 22 and the filling chamber 23 communicate with each other through the through hole 24. The valve plate 30 is disposed in the valve chamber 22. An outer peripheral edge of an open end of the valve chamber 22 is provided with a flange 25 extending radially outwardly. The surface of the flange 25 is provided with a first sealing film 26 to confine the valve plate 30 within the valve chamber 22. The preservative 40 (which may be a desiccant or a deoxidizer) is disposed in the filling chamber 23. An inlet end of the filling chamber 23 is provided with a breathable film 27 to confine the preservative 40 within the filling chamber 23. The outer end of the breathable film 27 is provided with a second sealing film 28. As shown in FIG. 3, when not in use, the preservative 40 filled in the filling chamber 23 of the valve body 20 of the exhaust valve 10 is sealed inside the valve body 20 by the first sealing film 26 and the second sealing film 28 to prevent outside air or moisture from entering the filling chamber 23, so that the active ingredients of the preservative 40 can be stored for a long time. When a dried food (not shown) is to be packaged by using the packaging bag having the exhaust valve 10, in the process of manufacturing the packaging bag, as shown in FIGS. 4 and 5, the second sealing film 28 is opened (e.g., the filling chamber 23 is perforated), and the surface of the first sealing film 26 is adhered to the paper surface inside the packaging bag 50, and the paper surface is perforated relative to the valve chamber 22 to form an air outlet 51 penetrating the first sealing film 26, so that the valve chamber 22 can communicate with the outside through the air outlet 51. When the packaging bag 50 is sealed (the bag opening is closed) to complete the packing of the dried food, there is a space inside the packaging bag 50 relative to the dried food. By squeezing the outside of the packaging bag 50, the valve plate 30 in the valve chamber 22 of the valve body 20 can be moved back and forth relative to the position of the through hole 24, such that the air in the space passes through the preservative 40 (Note: the preservative 40 is generally presented in the form of a powder, so air is allowed to pass.) and the through hole 24 in a one-way manner, and the air is squeezed out from the air outlet 51 of the packaging bag 50 to the outside. The air, not squeezed out (the outside), is remained in the packaging bag 50. In a state where the valve plate 30 closes the through hole 24, as shown in FIG. 6, the preservative 40 in the filling chamber 23 can pass through the breathable film 27 to the inside of the packaging bag 50 for dehumidifying or deoxidizing the air remaining in the packaging bag 50, which can reduce or avoid the deterioration of the dried food caused by the residual air and effectively prolong the shelf life of the dried food in the packaging bag 50.

According to the above embodiment, a filtrating film 29 is attached to the surface of one end of the partition 21 in the valve body 20. The filtrating film 29 covers one end of the through hole 24. The filtrating film 29 is configured to prevent the preservative 40 in the filling chamber 23 from leaking. As shown in FIG. 5, during the exhausting process, the powder (agent) of the preservative 40 is prevented from entering the valve chamber 22. As shown in FIG. 6, in the non-exhaust state, it is ensured that the operation of the valve plate 30 to close the through hole 24 in one direction is normal (unobstructed), and the exhausting effect is good for a long time.

According to the above embodiment, as shown in FIGS. 1, 2, and 3, the inlet end of the filling chamber 23 of the valve body 20 is provided with a stepped mouth portion 230. The breathable film 27 and the second sealing film 28 are sequentially (from the inside to the outside) attached to the stepped mouth portion 230 to form a gap 231 between the breathable film 27 and the second sealing film 28. When the second sealing film 28 is punctured by a needle (not shown), the needle only enters the gap 231 without damaging the breathable film 27. As shown in FIGS. 4 and 5, the second sealing film 28 is punctured to form a vent hole 280 for the preservative 40 in the filling chamber 23 to communicate with the inside of the packaging bag 50 (the dried food).

Figure 7:
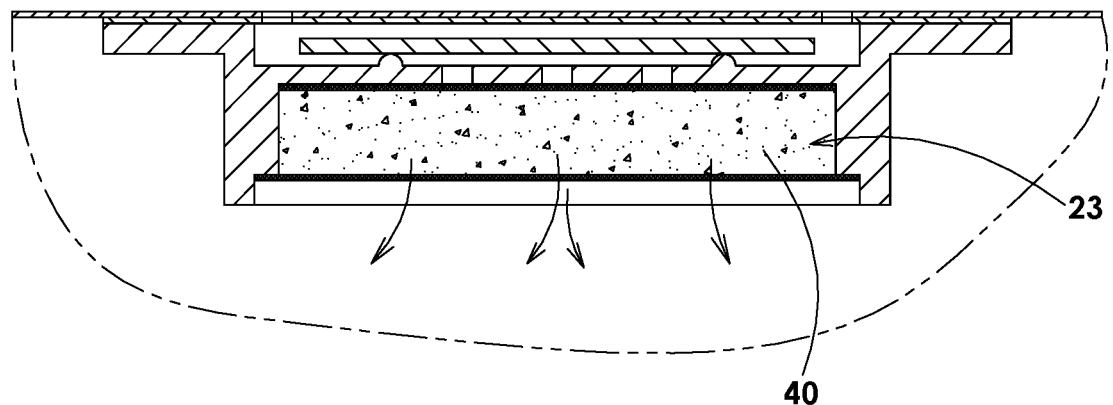
FIG. 7 is a schematic view in accordance with another embodiment of the present invention, showing the filling chamber is opened.

According to the above embodiment, as shown in FIGS. 1, 2, and 3, the second sealing film 28 which can be peeled off is adhered to the outer end of the breathable film 27 at the inlet end of the filling chamber 23. The second sealing film 28 can be individually removed from the outer end of the breathable film 27, as shown in FIGS. 3 and 7, so that the preservative 40 in the filling chamber 23 can communicate with the inside of the packaging bag 50 (the dried food).

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A packaging bag fresh-keeping exhaust valve structure, being an exhaust valve, comprising a valve body, a valve plate and a preservative; the valve body being provided with a partition to partition an internal space of the valve body into a valve chamber and a filling chamber; the partition being formed with at least one through hole so that the valve chamber and the filling chamber communicate with each other through the through hole; the valve plate being disposed in the valve chamber, an outer peripheral edge of an open end of the valve chamber being provided with a flange extending radially outwardly, a surface of the flange being provided with a first sealing film to confine the valve plate within the valve chamber; the preservative being disposed in the filling chamber, an inlet end of the filling chamber being provided with a breathable film to cover the filling chamber and confine the preservative within the filling chamber, and an outer end of the breathable film being provided with a second sealing film to seal the filling chamber; wherein the valve plate is completely movable in the valve chamber with no fastening to selectively close or open the through hole, and the valve plate is either planarly attached on the first sealing film to open the through hole or planarly placed on the partition to close the through hole.

2. The packaging bag fresh-keeping exhaust valve structure as claimed in claim 1, wherein a filtrating film is attached to a surface of one end of the partition in the valve body, the filtrating film covers one end of the through hole, and the filtrating film is configured to prevent the preservative in the filling chamber from leaking.

3. The packaging bag fresh-keeping exhaust valve structure as claimed in claim 1, wherein the second sealing film which can be peeled off is adhered to the outer end of the breathable film at the inlet end of the filling chamber, and the second sealing film can be individually removed from the outer end of the breathable film.

4. The packaging bag fresh-keeping exhaust valve structure as claimed in claim 1, wherein the inlet end of the filling chamber of the valve body is provided with a stepped mouth portion, the breathable film and the second sealing film are sequentially, from the inside to the outside, attached to the stepped mouth portion to form a gap between the breathable film and the second sealing film; when the second sealing film is punctured by a needle, the needle only enters the gap without damaging the breathable film.

\* \* \* \* \*